United States Patent
Alur

(12) 
(10) Patent No.: US 6,581,044 B1
(45) Date of Patent: Jun. 17, 2003

(54) METHOD AND APPARATUS FOR ENCODING LICENSE PARAMETERS WITHIN A LICENSE NUMBER FOR AUTHENTICATION PURPOSES

(75) Inventor: Deepak Alur, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 369 days.

(21) Appl. No.: 09/592,051

(22) Filed: Jun. 12, 2000

(51) Int. Cl.[7] .............................................. G06F 17/60
(52) U.S. Cl. ............................ 705/59; 705/67; 705/76; 713/200; 713/201
(58) Field of Search ................................ 713/700, 201, 713/202; 209/229; 380/200, 201, 202; 705/59, 64, 5, 67, 76; 707/2, 3

(56) References Cited

U.S. PATENT DOCUMENTS

| 5,758,069 A | * | 5/1998 | Olsen ........................ 713/201 |
| 5,905,860 A | * | 5/1999 | Olsen et al. ................ 713/201 |
| 6,119,124 A | * | 9/2000 | Broder et al. ............... 707/103 |
| 6,169,976 B1 | * | 1/2001 | Colosso ....................... 705/59 |

FOREIGN PATENT DOCUMENTS

JP 406282753 A * 10/1994

OTHER PUBLICATIONS

Secrets of Assets Searching; Security Management v40n5 pp 90–91 May 1996; Cassidy, Kevin.*

* cited by examiner

Primary Examiner—Pierre E. Elisca
(74) Attorney, Agent, or Firm—Park Vaughan & Fleming LLP

(57) ABSTRACT

A system that generates a license number based upon license parameters so that the license number can be authenticated by establishing that the license number was generated using the license parameters. The system operates by receiving the license parameters from a person requesting a license. The system encodes these license parameters into a license number so that the license parameters can be restored by decoding the license number. Next, the system facilitates printing of the license for the person requesting the license. Note that this printed license includes the license number. The system authenticates the license by receiving the license number, and decoding the license number to restore the license parameters. Next, the system displays the license parameters to a person authenticating the license, and then allows the person authenticating the license to verify the license parameters against information from a photo ID provided by a license holder.

32 Claims, 4 Drawing Sheets

METHOD AND APPARATUS FOR ENCODING LICENSE PARAMETERS WITHIN A LICENSE NUMBER FOR AUTHENTICATION PURPOSES

COPYRIGHT NOTICE PURSUANT TO 37 C.F.R. 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to encryption of data and issuing licenses, such as fishing licenses. More specifically, the present invention relates to a method and an apparatus for generating and issuing license numbers based upon license parameters that allows the license number to later be authenticated by establishing that the license number was generated using the license parameters.

2. Related Art

The recent explosive growth of electronic commerce has led to a proliferation of web sites on the Internet selling products as diverse as toys, books and automobiles, and providing services, such as insurance and stock trading. Millions of consumers are presently surfing through web sites in order to gather information, to make purchases, or purely for entertainment.

Migrating a process (or a service) to the web can provide tremendous advantages because the process instantly becomes accessible from web browsers on millions of personal computers worldwide. Furthermore, by making the process available on a web site, users can interact with the process in an automated manner, without requiring assistance from a human service representative. This automation can dramatically reduce the cost of providing the process.

One process that so far has not been adapted to the web is the issuance of licenses, such as fishing licenses. Issuing licenses of this type provides a number of challenges. One challenge arises because people who are responsible for authenticating the licenses, such as fish and game representatives or park rangers, must be able to authenticate the license at remote locations, perhaps miles from the nearest telephone line. Consequently, the authenticators do not have access to a centralized database containing records of issued licenses. Furthermore, it is not practical to periodically download data from a centralized database because people commonly purchase licenses and use them on the same day. Hence, a previous download of license data may not contain a record of a recently issued license.

Furthermore, even if the authenticator has access to a portable computing device to perform the authentication, the authenticator may have to manually input the data to perform the authentication. This makes it impractical to input more than a small amount of data into the portable computing device to perform the authentication, because an authenticator is not likely to be willing to spend a great deal of time entering a large amount of data. Furthermore, in entering a large amount of data, an authenticator is more likely to make errors.

Hence, what is needed is a method and an apparatus for issuing and authenticating a license that enables an authenticator in the field to enter a small amount of data into a computing device in order to authenticate the license.

SUMMARY

One embodiment of the present invention provides a system that generates a license number based upon license parameters so that the license number can be authenticated by establishing that the license number was generated using the license parameters. The system operates by receiving the license parameters from a person requesting a license. The system encodes these license parameters into a license number so that the license parameters can be restored by decoding the license number. Next, the system facilitates printing of the license for the person requesting the license. Note that this printed license includes the license number.

In one embodiment of the present invention, the system authenticates the license by receiving the license number, and decoding the license number to restore the license parameters. Next, the system displays the license parameters to a person authenticating the license, and then allows the person authenticating the license to verify the license parameters against information from a photo ID provided by a license holder.

In one embodiment of the present invention, the system receives the license parameters at a web site from a remote browser operated by the person requesting the license.

In one embodiment of the present invention, the system facilitates printing of the license by sending the license to the remote browser so that the person requesting the license can print out the license from the remote browser.

In one embodiment of the present invention, the license is a fishing license.

In one embodiment of the present invention, the license number is of a size less than 20 characters long so that it can be easily inputted by a human into a computer system so that the license number easily be authenticated.

In one embodiment of the present invention, the license parameters include at least one of: a license type, a valid time period for the license, a photo identification number, a unique sequence number generated by the system and added to the license parameters, a credit card number, an address of the person requesting the license, and information for additional family members to be included in the license.

In one embodiment of the present invention, encoding the license parameters involves using a pre-computed random permutation to perform the encoding.

In a variation on the above embodiment, the system additionally rotates a result of the pre-computed random permutation by a random rotation distance, and incorporates a rotation index specifying the random rotation distance into the license number.

In a variation on this embodiment, encoding the license parameters includes using a selected permutation from a set of pre-computed random permutations to perform the encoding, wherein the selected permutation is specified by a permutation identifier that is incorporated into the license number. The system may additionally rotate the permutation identifier by a second random rotation distance, and incorporate a second rotation index specifying the second random rotation distance into the license number.

In one embodiment of the present invention, the system additionally executes a payment transaction to receive a license fee from the person requesting the license.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer Systems

Figure 1:
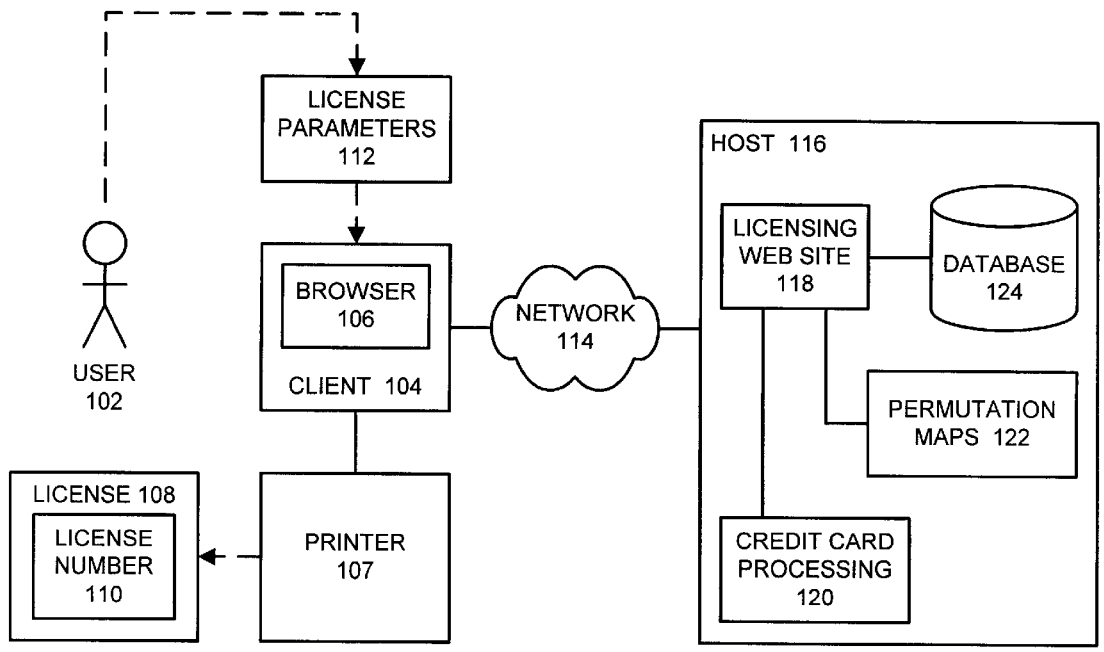
FIG. 1 illustrates a client coupled to a host by a network in accordance with an embodiment of the present invention.

FIG. 1 illustrates a client 104 coupled to a host 116 by a network 114 in accordance with an embodiment of the present invention.

Network 114 can include any type of wire or wireless communication channel capable of coupling together computing nodes. This includes, but is not limited to, a local area network, a wide area network, or a combination of networks. In one embodiment of the present invention, network 114 includes the Internet.

Client 104 can include any node on a network including computational capability and including a mechanism for communicating across network 114. Client 104 contains browser 106 and is operated by user 102. Browser 106 can include any type of web browser capable of viewing a web site, such as the NETSCAPE NAVIGATOR™ browser distributed by the Netscape Corporation of Mountain View, Calif. or the INTERNET EXPLORER™ browser distributed by the Microsoft Corporation of Redmond, Wash. Client 104 additionally includes a printer 106 for printing an issued license 108. Note that license 108 includes a specially created license number 110, which can later be verified by an authenticator 202, as is described below with reference to FIG. 2.

Host 116 can include any computational node including a mechanism for servicing requests from client 104 for computational and/or data storage resources. Host 116 includes licensing web site 118, which contains inter-linked pages of textual and graphical information containing information and forms related to obtaining a license 108. Web site 118 is coupled with credit card processing mechanism 120, which facilitates receiving a credit card payment for a license 108. Licensing web site 118 is additionally coupled to permutation maps 122, which contain pre-computed random permutations that can be used to encode license parameters 112 into a license number 110 for a license 108. Licensing web site 118 is additionally coupled to database 124, which contains records pertaining to issued licenses. (Note that permutation maps 122 may be stored within database 124).

The system illustrated in FIG. 1 operates generally as follows. User 102 enters license parameters 112 into a form in browser 106. These license parameters can include any data relevant to a license such as, a license type, a valid time period for the license, a photo identification number, a unique sequence number generated by the system and added to the license parameters, a credit card number, an address of the person requesting the license, and information for additional family members to be included in the license.

Browser communicates license parameters 112 to web site 118 on host 116. Web site 118 encodes the license parameters 112 in a special license number 110. This license number 110 is communicated to browser 106, which allows user 102 to print out a license 108 including the special license number 110 using printer 107.

SYSTEM FOR AUTHENTICATING LICENSE

Figure 2:
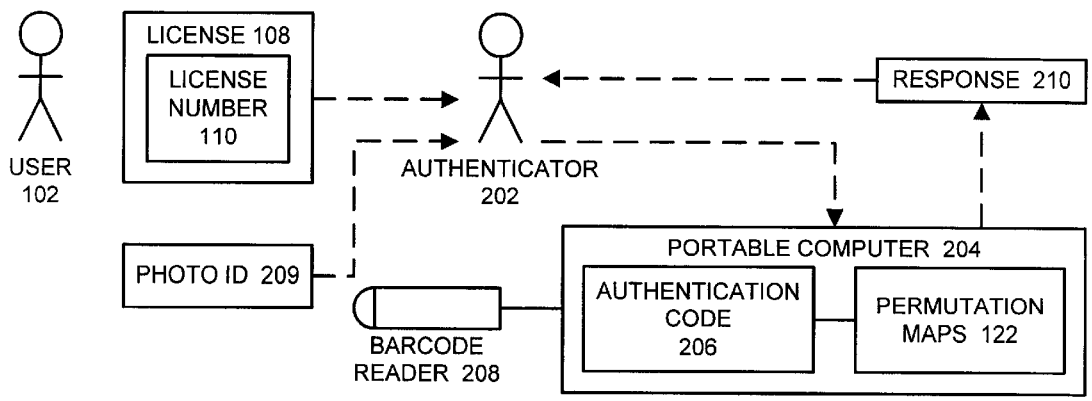
FIG. 2 illustrates a system for authenticating a license in accordance with an embodiment of the present invention.

FIG. 2 illustrates a system for authenticating a license 108 in accordance with an embodiment of the present invention. The system illustrated in FIG. 2 generally operates as follows. A user 102 presents license 108, which includes license number 110, and photo ID 209 to authenticator 202. Authenticator 202 can be any person responsible for authenticating license 108, such as a park ranger or a representative of a fish and game department of a local jurisdiction.

Next, authenticator 202 inputs license number 110 into portable computer 204 either through manual input, or through use of an electronic reading device, such as a bar code reader 208. Note that portable computer 204 can include any type of portable computing device, such as a laptop computer or a personal organizer.

Within portable computer 204, license number 110 is decoded using authentication code 206, which makes use of permutation maps 122 to perform the decoding.

Next, portable computer 204 outputs a response 210 to authenticator 202 indicating whether or not license number 110 is valid. If license number 110 is valid, response 210 includes identification information, such as a driver's license number, which authenticator 202 verifies against photo ID 209.

Process of Generating Random Permutations

Figure 3:
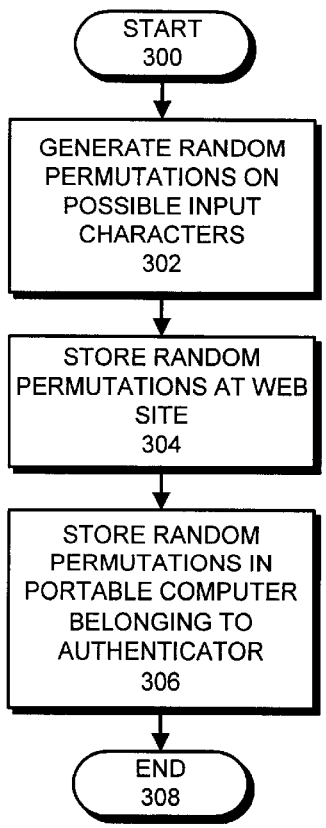
FIG. 3 is a flow chart illustrating the process of generating random permutations for the encoding process in accordance with an embodiment of the present invention.

FIG. 3 is a flow chart illustrating the process of generating random permutations (permutation maps) for the encoding process in accordance with an embodiment of the present invention. The random permutations of all of the possible input characters are pre-computed using unique random number generator seeds (step 302).

Once the random permutations are pre-computed, the system stores the random permutations (permutation maps 122) so that they are accessible by web site 118 in host 116. This allows web site 118 to use permutation maps 122 in encoding license parameters 112 to produce license number 110 (step 304). Permutation maps 122 are additionally stored on portable computer 204 so that they can be used to decode license number 110 (step 306).

Process of Creating a License

Figure 4:
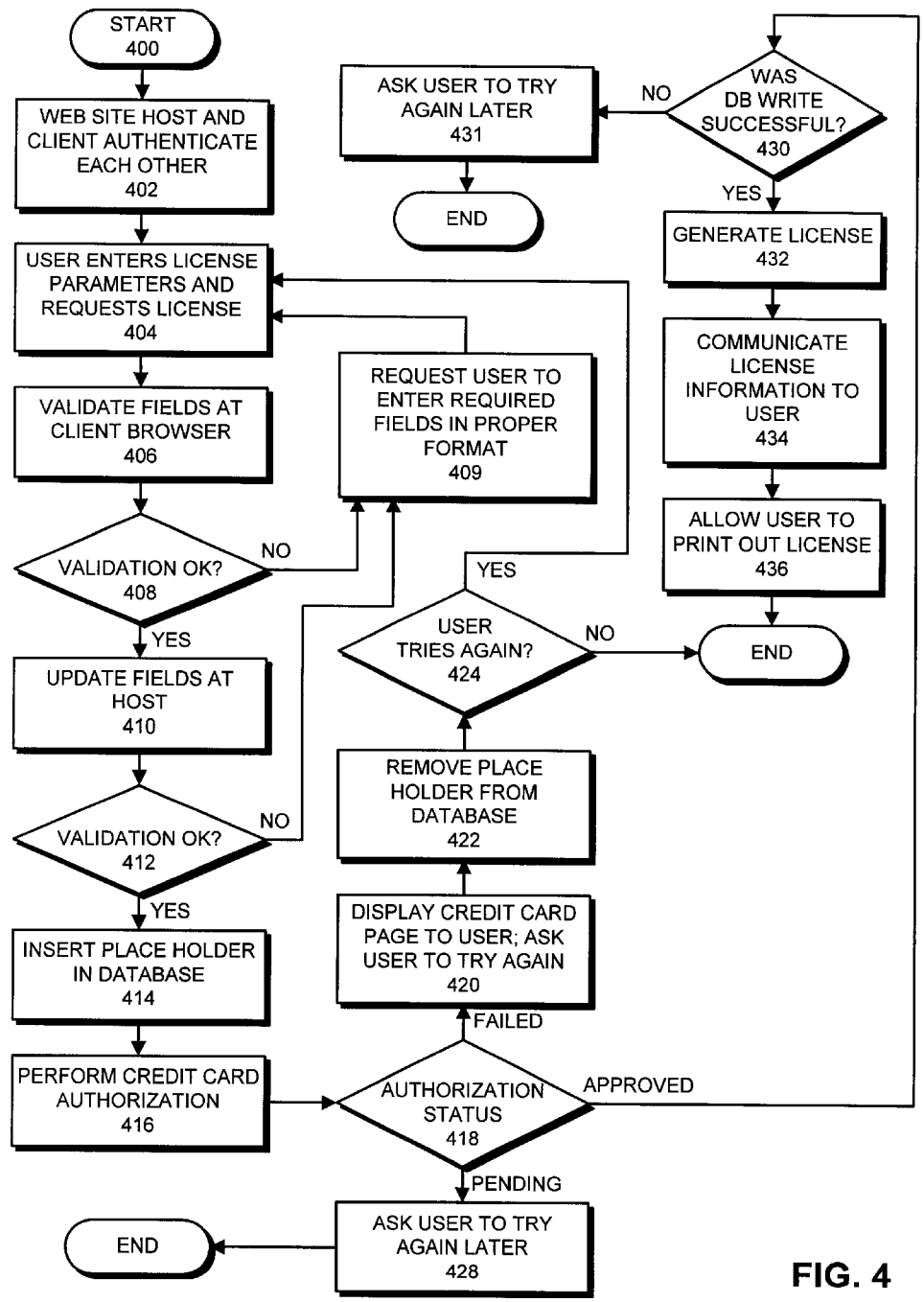
FIG. 4 is a flow chart illustrating the process of creating a license in accordance with an embodiment of the present invention.

FIG. 4 is a flow chart illustrating the process of creating a license 108 in accordance with an embodiment of the present invention. First, web site host 116 and client 104 authenticate each other (step 402). In one embodiment of the present invention, this is accomplished by exchanging digital certificates.

Next, user 102 enters license parameters 112 into browser 106 and requests a new license 108 (step 404). Recall, that these license parameters can include any data relevant to a license, such as a license type, a valid time period for the license, a photo identification number, a unique sequence number generated by the system and added to the license parameters, a credit card number, an address of the person requesting the license, and information for additional family members to be included in the license.

Browser 106 validates fields containing license parameters 112 (step 406). If this validation fails, the system sends a request to user 102 to re-enter the data in a proper format (step 409). Next, the system returns to step 404 to accept additional license parameters 112.

If this validation succeeds, the system again validates the fields at the host 116 (step 410). If this validation fails, the system sends a request to user 102 to re-enter the data in proper format (step 409), and the system returns to step 404 to accept additional license parameters 112.

If this host validation succeeds, the system inserts a placeholder for the new license 108 in database 124 (step 414).

Next, the system performs a credit card authorization, or some other payment transaction, to receive payment from user 102 for license 108 (step 416). This authorization returns an authorization status. If the authorization status is "pending," the system asks user 102 to try again later (step 428) and the process terminates.

If the authorization status is "failed," the system displays a credit card failure page to user 102 (step 420). This failure page asks user 102 to try again. At this point, the system removes the placeholder from the database (step 422). If user 102 decides not to try again, the process terminates. Otherwise, if user 102 decides to try again, the system returns to step 404 to accept new license parameters 112.

If the authorization status is "approved," the system determines if the write to database 124 to insert the placeholder was successful (step 430). If the write was not successful, the system asks the user to try again later (step 431), and the process terminates. If the write was successful, the system generates a new license 108 including license number 110 (step 432). This process of license number generation is described in more detail below with reference to FIG. 5. The system then communicates the license information to user 102 by sending it to browser 106 (step 434). This allows user 102 to print out license 108 on printer 106 (step 436). At this point, user 102 is in possession of a valid license 108, including license number 110.

Figure 5:
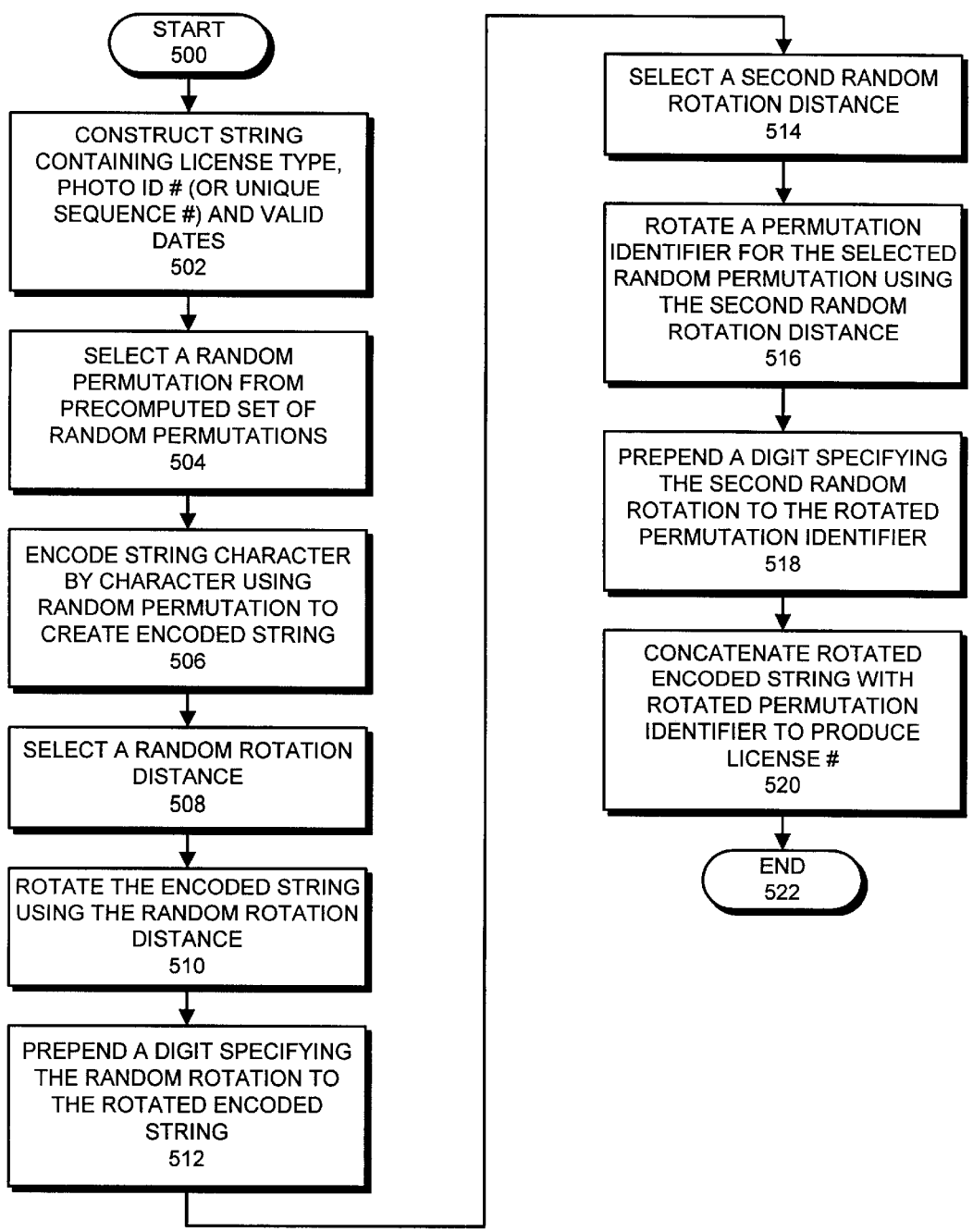
FIG. 5 is a flow chart illustrating the process of generating a license number from license parameters in accordance with an embodiment of the present invention.

FIG. 5 is a flow chart illustrating the process of generating a license number 110 from license parameters 112 in accordance with an embodiment of the present invention. The system first constructs a string containing information from license parameters 112 (step 502). In one embodiment of the present invention, this string contains two digits indicating a license type, a driver's license number (or other photo ID number), and possibly a valid date (or range of valid dates) for the license. Note that instead of the license number, the system can alternatively include a unique system-generated sequence number.

Next, the system selects a random permutation from the pre-computed set of random permutations (permutation maps 122) (step 504), and then encodes the string character-by-character using the selected random permutation to create an encoded string (step 506).

Next, the system selects a random rotation distance for the encoded string (step 508), and then rotates the encoded string by the random rotation distance (step 510). The system also prepends a digit indicating the random rotation distance to the encoded rotated string (step 512).

The system also rotates a permutation identifier, which identifies the selected permutation in the pre-computed set of random permutations. This is accomplished by selecting a second random rotation distance (step 514), and rotating the permutation identifier by the second random permutation distance (step 516). The system similarly prepends a digit indicating the second random rotation distance to the rotated permutation identifier (step 518).

Finally, the license number is created by concatenating the rotated encoded string with the rotated permutation identifier (step 520).

Note that although the flow chart in FIG. 5 illustrates a specific process for converting license parameters 112 into a license number 110, any other process can be used so long as the process does not generate a license number that is too long to be easily inputted into a computer system. Many commonly used encryption techniques, such as the Data Encryption Standard (DES), generate an encoded string that is hundreds of characters long. Such encoded an string is too long to be manually inputted in the system.

Process of Decoding a License

Figure 6:
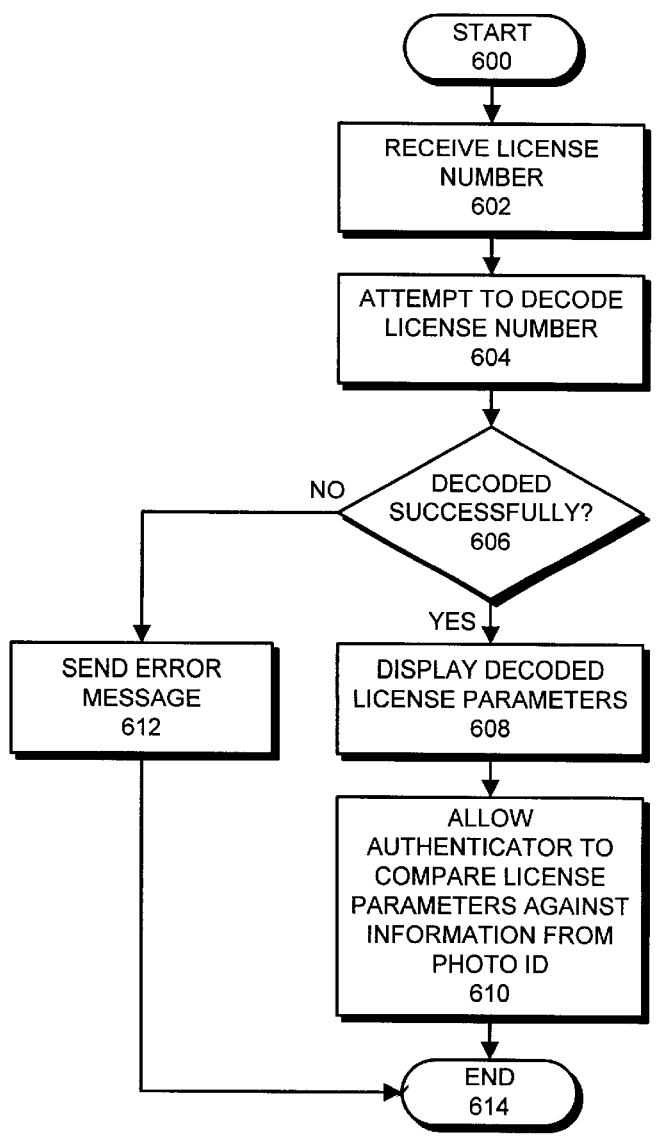
FIG. 6 is a flow chart illustrating the process of decoding the license number in accordance with an embodiment of the present invention.

FIG. 6 is a flow chart illustrating the process of decoding the license number 110 in accordance with an embodiment of the present invention. The system first receives license number 110 from authenticator 202 (step 602). Next, the system attempts to decode license number 110 using the reverse of the process for creating license number 110 described above with reference to FIG. 5 (step 604).

Next, the system determines whether or not license number 110 decoded successfully by examining the values returned during the decoding process, and determining whether the values are within valid ranges (step 606). For example, a date with a month number 13 would be an invalid date.

If license number 110 does not decode successfully, the system sends an error message (step 612) to authenticator 202 and terminates. Otherwise, if license number 110 decodes successfully, the system displays the decoded license parameters to authenticator 202 (step 608). Next, the system allows authenticator 202 to compare the decoded license parameters (for example, a driver's license number) against photo ID 209 (step 610), so that the authenticator can verify that the license 108 belongs to the holder of the photo ID 209. This verification process ensures that a single license is not copied and used by multiple people. Note that any other type of identification with a unique identifier can be used instead of photo ID 209. For example, a social security card, a credit card or an automobile license plate number.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art.

For example, the present invention can generally be applied to any system for issuing licenses or identification badges in which a license or an identification badge is authenticated using a remote computing device that is not in constant communication with a centralized repository for license or identification badge information.

Additionally, the above disclosure is not intended to limit the present invention. The scope of the present invention is defined by the appended claims.

What is claimed is:

1. A method for generating a license number based upon license parameters so that the license number can be authenticated by establishing that the license number was generated using the license parameters, the method comprising:
    receiving license parameters from a person requesting a license;
    encoding the license parameters into a license number so that the license parameters can be restored by decoding the license number, wherein the license parameters cannot be determined from the license number without decoding the license number and wherein encoding the license parameters includes using a pre-computed random permutation to perform the encoding;
    rotating a result of the pre-computed random permutation by a first random rotation distance;
    incorporating a first rotation index specifying the first random rotation distance into the license number; and
    facilitating printing of the license for the person requesting the license;
    wherein the license includes the license number.

2. The method of claim 1, further comprising authenticating the license by:
    receiving the license number;
    decoding the license number to restore the license parameters;
    displaying the license parameters to a person authenticating the license; and
    allowing the person authenticating the license to verify the license parameters against information from a photo ID provided by a license holder.

3. The method of claim 1,
    wherein receiving the license parameters includes receiving the license parameters at a web site from a remote browser operated by the person requesting the license; and
    wherein facilitating printing of the license includes sending the license to the remote browser so that the person requesting the license can print out the license from the remote browser.

4. The method of claim 1, wherein the license is a fishing license.

5. The method of claim 1, wherein the license number is of a size less than 20 characters long so that it can be easily inputted by a human into a computer system so that the license number easily be authenticated.

6. The method of claim 1, wherein the license parameters include at least one of:
    a license type;
    a valid time period for the license;
    a photo identification number;
    a unique sequence number generated by the system and added to the license parameters;
    a credit card number;
    an address of the person requesting the license; and
    information for additional family members to be included in the license.

7. The method of claim 1,
    wherein encoding the license parameters includes using a selected permutation from a set of pre-computed random permutations to perform the encoding; and
    wherein the selected permutation is specified by a permutation identifier that is incorporated into the license number.

8. The method of claim 7, further comprising:
    rotating the permutation identifier by a second random rotation distance; and
    incorporating a second rotation index specifying the second random rotation distance into the license number.

9. The method of claim 1, further comprising executing a payment transaction to receive a license fee from the person requesting the license.

10. A method for authenticating a license number that was produced by encoding license parameters into the license number so that the license parameters can later be restored by decoding the license number, wherein the license parameters cannot be determined from the license number without decoding the license number and wherein encoding the license parameters includes using a pre-computed random permutation to perform the encoding, the method comprising:
    receiving the license number at a computer system;
    decoding the license number to restore the license parameters;
    wherein decoding the license number involves:
        recovering a rotation index specifying a random rotation distance from the license number, and
        rotating a result of decoding the license number by the random rotation distance;
    displaying the license parameters to a person authenticating a license; and
    allowing the person authenticating the license to verify the license parameters against information from a photo ID provided by a license holder.

11. The method of claim 10, wherein decoding the license parameters includes using a pre-computed random permutation to perform the decoding.

12. A computer-readable storage medium storing instructions that when executed by a computer cause the computer to perform a method for generating a license number based upon license parameters so that the license number can be authenticated by establishing that the license number was generated using the license parameters, the method comprising:
    receiving license parameters from a person requesting a license;
    encoding the license parameters into a license number so that the license parameters can be restored by decoding the license number, wherein the license parameters cannot be determined from the license number without decoding the license number and wherein encoding the license parameters includes using a pre-computed random permutation to perform the encoding;

rotating a result of the pre-computed random permutation by a first random rotation distance;

incorporating a rotation index specifying the first random rotation distance into the license number; and facilitating printing of the license for the person requesting the license;

wherein the license includes the license number.

13. The computer-readable storage medium of claim 12, wherein the method further comprises authenticating the license by:

receiving the license number;

decoding the license number to restore the license parameters;

displaying the license parameters to a person authenticating the license; and allowing the person authenticating the license to verify the license parameters against information from a photo ID provided by a license holder.

14. The computer-readable storage medium of claim 12, wherein receiving the license parameters includes receiving the license parameters at a web site from a remote browser operated by the person requesting the license; and wherein facilitating printing of the license includes sending the license to the remote browser so that the person requesting the license can print out the license from the remote browser.

15. The computer-readable storage medium of claim 12, wherein the license is a fishing license.

16. The computer-readable storage medium of claim 12, wherein the license number is of a size less than 20 characters long so that it can be easily inputted by a human into a computer system so that the license number easily be authenticated.

17. The computer-readable storage medium of claim 12, wherein the license parameters include at least one of:

a, license type;

a valid time period for the license;

a photo identification number;

a unique sequence number generated by the system and added to the license parameters;

a credit card number;

an address of the person requesting the license; and information for additional family members to be included in the license.

18. The computer-readable storage medium of claim 12, wherein encoding the license parameters includes using a selected permutation from a set of pre-computed random permutations to perform the encoding; and wherein the selected permutation is specified by a permutation identifier that is incorporated into the license number.

19. The computer-readable storage medium of claim 18, wherein the method further comprises:

rotating the permutation identifier by a second random rotation distance; and incorporating a second rotation index specifying the second random rotation distance into the license number.

20. The computer-readable storage medium of claim 12, wherein the method further comprises executing a payment transaction to receive a license fee from the person requesting the license.

21. A computer-readable storage medium storing instructions that when executed by a computer cause the computer to perform a method for authenticating a license number that was produced by encoding license parameters into the license number so that the license parameters can later be restored by decoding the license number, wherein the license parameters cannot be determined from the license number without decoding the license number and wherein encoding the license parameters includes using a pre-computed random permutation to perform the encoding, the method comprising:

receiving the license number at a computer system;

decoding the license number to restore the license parameters;

wherein decoding the license number involves:

recovering a rotation index specifying a random rotation distance from the license number, and rotating a result of decoding the license number by the random rotation distance;

displaying the license parameters to a person authenticating a license; and allowing the person authenticating the license to verify the license parameters against information from a photo ID provided by a license holder.

22. The computer-readable storage medium of claim 21, wherein decoding the license parameters includes using a pre-computed random permutation to perform the decoding.

23. An apparatus that generates a license number based upon license parameters so that the license number can be authenticated by establishing that the license number was generated using the license parameters, the apparatus comprising:

an input receiving mechanism that is configured to receive license parameters from a person requesting a license;

an encoder that is configured to encode the license parameters into a license number so that the license parameters can be restored by decoding the license number, wherein the license parameters cannot be determined from the license number without decoding the license number and wherein encoding the license parameters includes using a pre-computed random permutation to perform the encoding;

a rotating mechanism that is configured to rotate a result of the pre-computed random permutation by a random rotation distance;

an incorporating mechanism that is configured to incorporate a rotation index specifying the random rotation distance into the license number; and an output mechanism that is configured to facilitate printing of the license for the person requesting the license;

wherein the license includes the license number.

24. The apparatus of claim 23, wherein the input receiving mechanism is configured to receive the license parameters at a web site from a remote browser operated by the person requesting the license; and wherein the output mechanism is configured to send the license to the remote browser so that the person requesting the license can print out the license from the remote browser.

25. The apparatus of claim 23, wherein the license is a fishing license.

26. The apparatus of claim 23, wherein the license number is of a size less than 20 characters long so that it can be easily inputted by a human into a computer system so that the license number easily be authenticated.

27. The apparatus of claim 23, wherein the license parameters include at least one of:
   a license type;
   a valid time period for the license;
   a photo identification number;
   a unique sequence number generated by the system and added to the license parameters;
   a credit card number;
   an address of the person requesting the license; and
   information for additional family members to be included in the license.

28. The apparatus of claim 23, wherein the encoder is configured to use a pre-computed random permutation to perform the encoding.

29. The apparatus of claim 23, further comprising a payment mechanism that is configured to execute a payment transaction to receive a license fee from the person requesting the license.

30. A apparatus for authenticating a license number that was produced by encoding license parameters into the license number so that the license parameters can later be restored by decoding the license number, wherein the license parameters cannot be determined from the license number without decoding the license number and wherein encoding the license parameters includes using a pre-computed random permutation to perform the encoding, the apparatus comprising:
   an input receiving mechanism that is configured to receive the license number at a computer system;
   a decoder that is configured to decode the license number to restore the license parameters;
   wherein decoding the license number involves:
      recovering a rotation index specifying a random rotation distance from the license number, and
      rotating a result of decoding the license number by the random rotation distance; and
   a display mechanism that is configured to display the license parameters to a person authenticating a license so that the person authenticating the license can verify the license parameters against information from a photo ID provided by a license holder.

31. A method for encoding a string containing textual information comprising: receiving the string;
   selecting a selected permutation from a set of pre-computed random permutations;
   encoding the string into a license number so that the string can be restored by decoding the license number, wherein the string cannot be determined from the license number without decoding the license number and wherein encoding the string includes using the selected permutation to produce an encoded string;
   rotating at least a portion of the encoded string by a first random rotation distance;
   incorporating a first rotation index specifying the first random rotation distance into the encoded string; and
   incorporating an identifier for the selected permutation into the encoded string.

32. The method of claim 31, further comprising:
   rotating the identifier for the selected permutation by a second random rotation distance; and
   incorporating a second rotation index specifying the second random rotation distance into the encoded string.

* * * * *